Patented Oct. 13, 1953

2,655,535

UNITED STATES PATENT OFFICE 2,655,535

RECOVERY OF CHLORTETRACYCLINE

Charles Pidacks, Spring Valley, and Edward E. Starbird, Nanuet, N. Y., assignors to American Cyanamid Company, New York, N. Y., a corporation of Maine No Drawing. Application November 23, 1949, Serial No. 129,184

17 Claims. (Cl. 260—559)

This invention relates to a process for the recovery of chlortetracycline from fermentation liquors and other aqueous media containing chlortetracycline, preferably as an acid salt, by extracting the chlortetracycline from the aqueous phase into a solvent phase, preferably with the aid of a salt to utilize a salting out effect, and recovering the thus isolated chlortetracycline.

An object of the invention is to recover chlortetracycline from its fermentation media or from other aqueous media in which it exists. The recovered product may be an acid salt, the free material, or a basic salt, depending upon the pH of the material at the time of the recovery of the chlortetracycline. Better yields are more readily obtained if conditions are such that the chlortetracycline is recovered as an acid salt, particularly the hydrochloride.

An additional object of this invention is to obtain a therapeutically effective form of chlortetracycline in a high yield of pure material. Various other objects and advantages will be more fully apparent from the description of the invention and the appended claims as herein disclosed.

This application is a continuation-in-part of an application of Edward E. Starbird and Charles Pidacks, Serial Number 62,722, filed November 30, 1948, entitled Isolation of Aureomycin, and an application of Charles Pidacks and Edward E. Starbird, Serial Number 62,766, filed November 30, 1948, entitled Isolation of Antibiotic, both of which applications are now abandoned in favor of application Serial Number 364,182, filed June 25, 1953, entitled Chlortetracycline, Purification, and Alkaline Earth Salts.

During the past few years many metabolic products of the growth of bacteria and fungi have been isolated and found to possess valuable therapeutic properties. Among the newer and more effective of these is the antibiotic known as chlortetracycline, produced by the use of *Streptomyces aureofaciens*. A method of fermentation and the product are described in a co-pending application of Benjamin M. Duggar, Serial Number 7,592, filed February 11, 1948, now Patent Number 2,482,055, dated September 13, 1949.

Chlortetracycline is produced and sold under the commercial designation "Aureomycin" which, in certain countries, is a trade-mark of the American Cyanamid Company. Chlortetracycline has been found to be a naphthacene derivative and while having a structure which strongly suggests tautomeric forms, is believed to exist with the following structure:

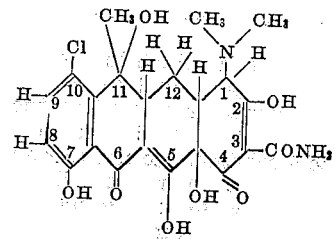

A numbering system is shown for the molecule. One proper name for the compound is 1-dimethylamino - 4, 6 - dioxo - 10 - chloro - 11- methyl - 2, 4a,5,7,11 - pentahydroxy - 1,4,4a,6,- 11,11a,12,12a - octahydronaphthacene - 3 - carboxamide. The generic term for the compound is chlortetracycline, sometimes spelled "chlorotetracycline" (Note.—Journal of the American Chemical Society, 74: 4976 (1952)).

We have found that it is possible to obtain a comparatively pure form of chlortetracycline by the convenient expedient of extraction, preferably with salting out of the chlortetracycline from an aqueous phase containing it into a suitable organic solvent. The solvent must necessarily be immiscible with the aqueous phase at the time of separation. With certain solvents, such as acetone, the solvent may be miscible with water but the separation be effected by the use of a salt which by a salting out effect causes the separation of the two components. The effect of salting out is a remarkably obscure phenomenon, and while the salting out of acetone from an aqueous layer is well known, the conjoint effect of the salt in increasing the partition coefficient of a material as slightly soluble in water as is chlortetracycline, is a remarkable phenomenon. A discussion of certain theories of the salting out effect is given at length in an article entitled "Experimental tests of recent theories descriptive of the salting out effect," by Penrose S. Albright, in the Journal of the American Chemical Society 59, 2098 (November 1937).

The salting out is not necessary in that with such solvents as normal butanol, which is immiscible with water at certain temperatures, the chlortetracycline may be extracted without the aid of a salt. More efficient separation is normally effected with the use of a salt, and for that reason a salt is normally to be used where cost is a factor. The distribution coefficient shows the relative degree of efficiency for each extraction, of which several may be used.

The extraction may be made under varying conditions of acidity. The most favorable partition coefficients are usually obtained at a fairly acidic point, but with such acidic solutions corrosion is frequently an important problem, so that an economic balance must be maintained between the decrease in corrosion with the decrease of acidity and the less favorable partition coefficients which are usually thereby obtained. The choice of pH range depends largely upon economic considerations, particularly corrosion. As current therapeutic practice demands the chlortetracycline as the hydrochloride, it is most conveniently salted out by the use of a chloride salt at a fairly low pH so that the chlortetracycline is recovered as the hydrochloride.

In the extraction, multiple extractions and countercurrent extractions are convenient expedients where the scale of operations render the increased complexities economically practical. A packed column or other means, such as a Podbielniak extractor, or a centrifuge, may be used, as well as gravity separation of the phases in the extraction step.

The temperature at which the extraction takes place is governed partially by the considerations of equipment available as well as the solvents. Temperatures as high as 55°, particularly with the more acid solutions, do not cause undue decomposition of the chlortetracycline during its processing and because the solutions are less viscous as well as warm, a more rapid extraction is possible but the rate of corrosion also increases. Room temperature is convenient for small scale operations, and temperatures below room temperature are satisfactory but not normally so advantageous as to justify the cost of refrigeration.

After the extraction and the separation of the extract from the aqueous layer, the solvent may be at least partially removed by distillation. Normally a vacuum is preferred so that the temperature does not rise high enough to cause decomposition, it being preferred but not essential that the temperature remain below about 50° C. The solvent is removed until the chlortetracycline in the form in which it then exists is sufficiently concentrated to crystallize out on cooling, in which form it may then be recovered. The degree of concentration necessarily depends upon the amount of solvent used in the extraction, and the concentrations involved, but for economic runs frequently is in the neighborhood of 1/10 of the original volume with economic limits of from 5 to 25% of the original volume for many conditions. Ranges outside of this may of course be used by adjusting the extracting ratios so as to give a chlortetracycline concentration operable at such ranges. The concentrate may then be stirred and the crystals recovered. Depending upon the choice of solvents, the residual layer may be either largely water or solvent. For example, if the extraction media is acetone, the residual layer will be largely aqueous; if the extraction media is normal butanol, any water tends to come off with the distillate and the residue is substantially anhydrous butanol. The crystals may be removed by filtration, centrifugation, decantation or other form of separation, and washed in a suitable solvent and recovered. An improved recovery is obtained if the concentrate and wash solution are chilled. A wash of first ethanol, then water, and again ethanol usually yields a comparatively pure crystal without an undue portion of the material being dissolved. Other solvents such as methanol, the higher alcohols, Cellosolve, the ketones, etc. may be used and will remove most of the impurities from the crystals. The product normally changes from an original dark brown to a pale yellow with the wash. The water removes the inorganic salts which may be present.

The salt may be present up to the limit of its solubility but frequently a lesser amount of salt is more economically practical. The relative efficiency of the various solvents and the various salts may be seen from the examples showing their distribution coefficients. With sodium chloride, from 3 to 30% appears particularly useful.

The temperature does not appear to be particularly critical. Higher temperatures give a less viscous solution and a more rapid attainment of equilibrium but by the same token heat is expensive and the solutions are more corrosive at the higher temperatures.

The quantity of solvent is not particularly critical, more efficient results being obtained by using larger volumes and multiple countercurrent or other particularly efficient extraction procedures. Because of the cost of the solvents and because of the necessity for their later removal at low temperatures, it is normally convenient to use a lesser total volume of solvent than the aqueous volume being extracted. With butanol, from 20% to 60% by volume in a multiple or countercurrent extraction appears to give an economically efficient recovery, with 40% a convenient and economical compromise between recovery and cost of solvent.

The examples below show the efficacy of the various distribution systems and certain specific recoveries which are commercially practical. Variations from the concentrations, temperature, times, etc. in the examples are within the scope of the invention as set forth by the appended claims and may be readily adapted by those sufficiently skilled in the art to profit thereby.

EXAMPLE 1

To a fermentation mash containing soluble calcium was added sufficient 25% sodium hydroxide to raise the pH to 8.5. The solids were removed by filtration. The solids were slurried with a dilute acid at a pH of 1.4 in a volume approximately equal to 25% of the original mash volume, sulfuric acid being used. The slurry was filtered and again extracted with the same volume of water made acid to a pH of 1.5 with sulfuric acid. The liquid filtrates were combined and thereto added 17% on a weight per volume basis of sodium chloride. Thereto was added 40% by volume of butanol and the butanol extract separated after sufficient time and agitation for distribution of the chlortetracycline between the water and the butanol. The butanol extract was evaporated at a temperature of not more than 50° C. to 1/5 its original volume, then chilled after being made acid to a pH of 1 with hydrochloric acid. The chlortetracycline hydrochloride, separating therefrom as crystals, was removed by filtration, washed with water, ethanol and again with water, thereby obtaining a good yield of comparatively pure chlortetracycline as the hydrochloride.

EXAMPLE 2

*Partition of chlortetracycline hydrochloride between butanol and salt water*

To determine the optimum salt concentrations and acidity, the value of the distribution coefficient constant $K = C_{solvent}/C_{aqueous}$ was determined. Chlortetracycline as the hydrochloride was permitted to come to equilibrium at room temperature (25° C.) with equal volumes of butanol saturated with salt water and salt water saturated with butanol. The distribution coefficient was determined by analyzing the solvent and the aqueous layers, the ratios being as set forth below.

| Concentration NaCl, g./100 cc. | Distribution coeff. $K = \dfrac{C_{BuOH}}{C_{H_2O}}$ | | |
|---|---|---|---|
| | pH 2.8 | pH 1.5 | pH 1 |
| 0 | 1.3 | | |
| 2 | 2.8 | 4.4 | 15 |
| 6 | 3 | 7.3 | 28 |
| 10 | 2.9 | 10.0 | 41 |
| 15 | 3.2 | 13.3 | 38 |
| 20 | 3.0 | 21.1 | |
| 30 | 2.8 | | |

EXAMPLE 3

To a batch of 1650 liters of mash which was obtained at the end of the fermentation process at a pH of 6.4 was added sufficient barium hydroxide, as a thin slurry, to raise the pH to 8.5. 1% by weight of filter aid was added and the material filtered. The cake was suspended in 400 liters of water at a temperature of 50° C., and the solution was acidified to a pH of 1.5 with 4 normal sulfuric acid. More rapid extraction of the chlortetracycline from the filter cake results from the use of warm water and the resulting materials are handled more conveniently although water at room temperature is satisfactory. The resultant slurry was filtered and the cake discarded. The filtrate was adjusted to a pH of 8.5 with a concentrated solution of barium hydroxide, and filtered. The resultant cake was suspended in 160 liters of acetone, acidified to a pH of 1 with 4 normal sulfuric acid, 1 kilogram of sodium sulfate added, and the acetone layer separated from the residue. An additional wash of 60 liters of acetone was repeated twice, the acetone extracts pooled and the acetone removed under vacuum. The resultant precipitate in water was acidified slightly with sulfuric acid, the water separated off, yielding 125 grams of chlortetracycline as the sulfate. No appreciable amount of barium was present in the resulting product.

EXAMPLE 4

A batch of fermentation mash at a pH of 6.4 containing a total of 650 liters was adjusted to a pH of 8.5 with magnesium hydroxide. Magnesium hydroxide was added as a finely divided solid and sufficient time was allowed for measuring the pH after each addition to allow the magnesium to dissolve insofar as it was soluble, and the pH to stabilize. This requires about 20 minutes after each addition. The mash was filtered, washed, and the washed cake suspended in 400 liters of water at 50° C. The resultant slurry was adjusted to a pH of 1.5 with dilute sulfuric acid, filtered, and the cake discarded. The filtrate was adjusted to a pH of 8.5 with additional magnesium hydroxide, the precipitated solids were removed and suspended in 160 liters of acetone and adjusted to a pH of 1 with sulfuric acid. 1 kilogram of ammonium sulfate was added, the acetone layer separated and additionally washed with 2 increments of 50 liters of acetone each, the acetone extracts combined and the acetone evaporated therefrom under reduced pressure. The resulting precipitate was filtered off and crystallized by the use of hydrochloric acid, yielding 125 grams of crystals.

EXAMPLE 5

30 liters of fermented mash were adjusted to a pH of 8.7 by the addition of a lime slurry. The resulting slurry was filtered with the aid of a filter aid on the plate and frame filter press. The cake was then slurried in 6 liters of water, adjusted to a pH of 1.4 which required about 580 cc. of 6 normal hydrochloric acid, and the temperature raised to 50° C. After agitating for 15 minutes the slurry was filtered. The cake was re-extracted with another 6 liters of water at a pH of 1.3 with hydrochloric acid, filtered, and the extracts combined. To the pooled aqueous extracts 2295 grams of sodium chloride and 1350 milliliters of normal butyl alcohol were added. The water-alcohol mixture was agitated for 15 minutes, then allowed to separate by gravity and the layers separated. The aqueous layer was re-extracted with the same volume of butanol three more times. The four butanol extractions were pooled and concentrated under vacuum at a temperature not exceeding 50° C. to a volume of 300 milliliters at which point a considerable quantity of crystals had appeared. The solvent was cooled, the crystals separated by filtration, washed with water, ethyl alcohol, again with water, then dried under vacuum. The overall recovery was 35%.

EXAMPLE 6

The above experiment was repeated in which the alkalinization was accomplished by the use of 25% sodium hydroxide and the acidification was accomplished by the use of 9 normal sulfuric acid. Within the limits of experimental error, there was no effective difference in the recovery. The process appears to be slightly advantageous because of the price advantage of sulfuric acid over hydrochloric acid.

EXAMPLE 7

60 liters of fermented mash were acidified to a pH of 1.2 which required approximately 1700 milliliters of 6 normal hydrochloric acid. The slurry was filtered on a vacuum rotary continuous filter using a filter aid, and the spent mycelium cake discarded. 6 kilograms of sodium chloride and 6 liters of normal butanol were added to the filtrate. After agitating for 15 minutes the layers were allowed to separate by gravity and the butanol layer removed. The aqueous layer was re-extracted three additional times using 6 liters of butanol each time, and the four butanol extracts were combined. The butanol extract was concentrated to a volume of 700 milliliters under a vacuum of approximately 28 inches at which point chlortetracycline hydrochloride was crystallizing from the solution. The contents of the still were chilled and the crystals separated, washed with water, ethyl alcohol, again with water, and dried under vacuum. An overall yield of approximately 28% was obtained.

EXAMPLE 8

30 liters of a fermented mash were brought to pH of 8.6 by the addition of about 130 milliliters of a 10% suspension of calcium hydroxide. The slurry was filtered through a plate and frame filter press and the cake slurried in 6 liters of water, adjusted to a pH of 1.5 with 9 normal sulfuric acid at room temperature. After agitating for 15 minutes the slurry was filtered and the cake separated. The cake was re-extracted with a second 6 liters of water at a pH of 1.4 with sulfuric acid. The slurry was again filtered and the two extracts combined. The pooled water extracts were then concentrated by distillation at a temperature not exceeding about 50° C. to a volume of 3.25 liters. A precipitate which formed during the concentration was filtered off and found to be antibiotically ineffective and was discarded. To this clear filtrate 300 milliliters of normal butanol and 900 grams of sodium chloride were added. The mixture was agitated, the butanol separated by gravity, and the concentrate again extracted three more times with butanol. The extracts were combined, evaporated in a vacuum still until chlortetracycline hydrochloride began to precipitate, then the still contents were chilled and the chlortetracycline hydrochloride recovered by filtration. The chlortetracycline hydrochloride was washed with water, ethanol, again with water, then dried.

EXAMPLE 9

60 liters of a fermented mash were acidified with sulfuric acid to a pH of 1.5, stirred for one hour, and filtered. The filtrate was concentrated to half of its original volume, 30 liters, by evaporation under vacuum at a temperature not exceeding 50° C. Thereto was added 5.1 kilograms of sodium chloride. The mixture was extracted four times with 3 liters of normal butanol each. The twelve liters of extracts were combined and concentrated at a pH of 2.2 to 750 milliliters at a temperature of not more than 45° C. The concentrate was acidified to a pH of 0.7 with 12 normal hydrochloric acid and allowed to stand at room temperature overnight. The resulting crystals were filtered from the solution, washed with water, then with alcohol, and dried. An overall recovery of 71% of the original chlortetracycline was obtained.

EXAMPLE 10

100 grams of a crude chlortetracycline were suspended in 10 liters of water and acidified to a pH of 2.5 with hydrochloric acid. The mixture was stirred for 20 minutes with 50 grams of decolorizing carbon added, and the solution filtered. To the clear filtrate was added 1.7 kilograms of sodium chloride and 1 liter of normal butyl alcohol. After agitation, the liquids were allowed to settle and the butanol layer separated. Three additional butanolic extracts were made, the aqueous layer discarded, the butanolic extracts combined and concentrated under vacuum at a temperature of not more than 50° C. to 400 milliliters, the mixture acidified slightly with concentrated hydrochloric acid, chilled, and the resulting purified chlortetracycline hydrochloride separated therefrom by filtration. The crystals were washed once with butanol, then with ethanol and finally with water. The purity of the recovered crystals was much higher than that of the initial starting material.

EXAMPLE 11

6 liters of a fermented mash were acidified to a pH of 1.2 with 6 normal hydrochloric acid and the resulting slurry filtered, using diatomaceous earth as a filter aid, and the cake washed with 1 liter of water and the cake discarded. To the filtrate, including the wash, was added 20 grams per 100 cc. of sodium chloride and 25 cc. per 100 cc. of isophorone. After agitation, the isophorone layer was separated and the aqueous layer again extracted three times with a similar quantity of isophorone. The isophorone was removed under a comparatively high vacuum at a temperature not exceeding 50° C. until almost dry. 50 milliliters of ethyl alcohol were added, the mixture allowed to set at room temperature overnight, and the resultant chlortetracycline hydrochloride was separated by filtration, washed once with ethyl alcohol, then with water, and dried.

Other solvents may be used. For example, secondary butanol and benzyl alcohol each give comparatively high distribution coefficients and make excellent extraction solvents. Benzyl alcohol unfortunately though, has a density which is so close to that of water as to cause difficulty in the separation. It is more convenient if used as a mixed solvent with some lighter material such as benzene, so that it will separate more sharply from the saline layer. Other solvents such as isobutyl alcohol, ethyl acetate, normal hexanol, amyl acetate, amyl alcohol, butyl acetate, propyl acetate and methylisobutyl ketone all make satisfactory extraction solvents. The relative efficiency of normal butyl alcohol however, is superior to that of these other solvents so that where it is reasonably economically available, it is the solvent of choice.

Similarly a large number of salts other than sodium chloride are satisfactory. Sodium iodide, sodium bromide and barium chloride are particularly effective in causing the salting out of the chlortetracycline into the solvent layer. Sodium sulfate, ammonium sulfate, potassium sulfate, potassium chloride, magnesium sulfate, sodium oxylate, ammonium chloride and triethylamine hydrochloride are all satisfactory salting out materials, and may be used. Sodium chloride is particularly cheap and readily available and additionally has the highly desirable characteristic that it is therapeutically comparatively inert so that if part of the sodium chloride is permitted to remain in the refined product, no deleterious results occur. Also, the hydrochloride is the therapeutically preferred acid salt, and is best obtained with a chloride salt. Because of the comparatively large quantities of salt which are used, the economic advantages of using sodium chloride are such that it is normally used when commercially conveniently obtainable.

It is to be understood that in the recovery by solvent extraction the more solvent which is used, the greater will be the fraction of the active agent recovered. In the examples above, 9 for instance, the first butanol extraction contains a higher relative proportion of a purer chlortetracycline and it alone may be recovered if desired. However, the additional extractions are economically practicable under normal operating conditions as they reduce the cost of the therapeutically desirable compound.

As our invention we claim:

1. In the process of recovering chlortetracycline, the steps which comprise extracting an acidic aqueous chlortetracycline containing liquid with a volatile inorganic-salt-solution immiscible solvent selected from the group consisting of lower aliphatic alcohols, benzyl alcohol, acetone and lower alkyl esters of the lower fatty acids in the presence of a water-soluble inorganic salt selected from the group consisting of alkali metal, alkaline earth metal, ammonium and lower alkyl amine, halides and sulfates, said solvent being present in at least such quantity that an amount of pure chlortetracycline equal to the original chlortetracycline content of said chlortetracycline-containing liquor is soluble in said solvent, separating the solvent extract from the residual aqueous liquid and recovering the chlortetracycline from said solvent extract.

2. The process of claim 1 in which at least part of the solvent is evaporated off at a temperature at which the chlortetracycline is stable and the chlortetracycline is separated from the residual fraction.

3. The process of claim 2 in which the aqueous acidic solution is extracted at a pH between about 1 and 4.

4. The process of claim 1 in which the salt is an alkali metal halide and the solvent is a lower alkyl alcohol immiscible with the alkali metal halide containing aqueous liquid.

5. The process of claim 4 in which at least part of the solvent is evaporated off at a temperature at which the chlortetracycline is stable and the chlortetracycline is separated from the residual fraction.

6. The process of claim 1 in which the salt is sodium chloride and the solvent is a lower alkyl alcohol immiscible with the sodium chloride containing aqueous liquid.

7. The process of claim 6 in which at least part of the solvent is evaporated off at a temperature at which the chlortetracycline is stable and the chlortetracycline is separated from the residual fraction.

8. The process of claim 1 in which the salt is sodium chloride and the solvent is n-butanol.

9. The process of claim 8 in which at least part of the solvent is evaporated off at a temperature at which the chlortetracycline is stable and the chlorotetracycline is separated from the residual fraction.

10. The process of claim 1 in which the salt is an alkali metal sulfate and the solvent is a lower alkyl alcohol immiscible with the alkali metal sulfate containing aqueous liquid.

11. The process of claim 10 in which at least part of the solvent is evaporated off at a temperature at which the chlortetracycline is stable and the chlortetracycline is separated from the residual fraction.

12. The process of claim 1 in which the salt is sodium sulfate and the solvent is acetone.

13. The process of claim 12 in which at least part of the solvent is evaporated off at a temperature at which the chlortetracycline is stable and the chlortetracycline is separated from the residual fraction.

14. The process of claim 1 in which the salt is ammonium sulfate and the solvent is acetone.

15. The process of claim 14 in which at least part of the solvent is evaporated off at a temperature at which the chlortetracycline is stable and the chlortetracycline is separated from the residual fraction.

16. The process of claim 1 in which the salt is sodium chloride and the solvent is acetone.

17. The process of claim 16 in which at least part of the solvent is evaporated off at a temperature at which the chlortetracycline is stable and the chlortetracycline is separated from the residual fraction.

CHARLES PIDACKS.
EDWARD E. STARBIRD.

References Cited in the file of this patent

UNITED STATES PATENTS

| Number | Name | Date |
|---|---|---|
| 2,481,763 | Lineweaver | Sept. 13, 1949 |
| 2,482,055 | Duggar | Sept. 13, 1949 |

OTHER REFERENCES

Schoenbach, in Annals of the N. Y. Acad. of Sciences, vol. 51, Art. 2, November 1948, page 267.

Swart: Article in J. A. C. S., August 1949, pp. 2942–2945.